US012198269B2

(12) United States Patent
Pan et al.

(10) Patent No.: US 12,198,269 B2
(45) Date of Patent: Jan. 14, 2025

(54) METHOD AND SYSTEM FOR INVERSION OF HIGH-RESOLUTION AQUIFER STORAGE COEFFICIENT BASED ON GRAVITY SATELLITE DATA

(71) Applicant: Capital Normal University, Beijing (CN)

(72) Inventors: Yun Pan, Beijing (CN); Yalin Ma, Beijing (CN); Huili Gong, Beijing (CN)

(73) Assignee: Capital Normal University, Beijing (CN)

( * ) Notice: Subject to any disclaimer, the term of this patent is extended or adjusted under 35 U.S.C. 154(b) by 867 days.

(21) Appl. No.: 17/332,454

(22) Filed: May 27, 2021

(65) Prior Publication Data

US 2021/0375034 A1 Dec. 2, 2021

(30) Foreign Application Priority Data

May 29, 2020 (CN) ......................... 202010478011.6

(51) Int. Cl.
*G06T 17/05* (2011.01)
*G06F 30/20* (2020.01)
*G06F 111/08* (2020.01)

(52) U.S. Cl.
CPC .............. *G06T 17/05* (2013.01); *G06F 30/20* (2020.01); *G06F 2111/08* (2020.01)

(58) Field of Classification Search
CPC ................................ G06T 17/05; G06F 30/20
(Continued)

(56) References Cited

U.S. PATENT DOCUMENTS 10,309,812 B1 * 6/2019 Zhang ........................ G01F 1/86
2005/0228623 A1 * 10/2005 Leflon .................... G01V 11/00
703/2

(Continued)

FOREIGN PATENT DOCUMENTS

CN 106529164 A 3/2017
CN 108614948 A 10/2018

(Continued)

OTHER PUBLICATIONS

Frappart et al. (Monitoring Groundwater Storage Changes Using the Gravity Recovery and Climate Experiment (GRACE) Satellite Mission: A Review, MDPI, 2018, pp. 1-25) (Year: 2018).*

(Continued)

*Primary Examiner* — Iftekhar A Khan
(74) *Attorney, Agent, or Firm* — Millen, White, Zelano & Branigan P.C.; Wan-Ching Montfort

(57) ABSTRACT

Embodiments of a method and system for inversion of high-resolution aquifer storage coefficient based on gravity satellite data are disclosed. The method comprises: acquiring gravity satellite data, soil moisture storage data, surface water storage data and other non-groundwater component data, based on a preset region. The method also comprises: obtaining monthly time series of terrestrial water storage anomalies, by inversing the gravity satellite data; obtaining monthly time series of soil moisture storage anomalies, surface water storage anomalies, and other non-groundwater component anomalies; obtaining monthly time series of groundwater storage anomalies; and obtaining monthly time series of groundwater level anomalies in different aquifers. The method yet comprises: obtaining random sample values of storage coefficient by a stochastic simulation; obtaining correlation coefficient and Nash-Sutcliffe efficiency coefficient between random value of groundwater storage trend after a forward modeling and groundwater storage trend in (Continued)

ACQUIRING DESIRED DATA — S1
PROCESSING GRAVITY SATELLITE DATA — S2
FORWARD MODELING — S3
SEPARATING GROUNDWATER STORAGE CHANGES IN GRAVITY SATELLITE SIGNAL — S4
INTERPOLATING IN SITU GROUNDWATER LEVEL DATA — S5
CALCULATING TREND BASED ON MONTHLY DATA — S6
GENERATING RANDOM SAMPLE VALUES OF AQUIFER STORAGE COEFFICIENT — S7
CYCLICALLY CALCULATING CORRELATION COEFFICIENT AND NASH-SUTCLIFFE EFFICIENCY COEFFICIENT — S8
OBTAINING INVERSION RESULT — S9 the gravity satellite time-variable signal; and obtaining an inversion result.

7 Claims, 2 Drawing Sheets

(58) Field of Classification Search
USPC .......................................................... 703/9
See application file for complete search history.

(56) References Cited

U.S. PATENT DOCUMENTS

2011/0054869 A1* 3/2011 Li .......................... G01V 20/00 703/10
2016/0231458 A1* 8/2016 Zhang ...................... G01V 7/00
2019/0251215 A1* 8/2019 Linares ................... G01W 1/10
2021/0048557 A1* 2/2021 Long ....................... G06F 30/20
2021/0341445 A1* 11/2021 Bai .................... G01N 33/0098
2022/0300552 A1* 9/2022 Frugier-Dorrington ..................... G01V 99/00

FOREIGN PATENT DOCUMENTS

CN 109035105 A 12/2018
CN 110175214 A 8/2019

OTHER PUBLICATIONS

Huang et al. (Sensitivity Analysis of Leakage Correction of GRACE Data in Southwest China Using A-Priori Model Simulations: Inter-Comparison of Spherical Harmonics, Mass Concentration and In Situ Observations, 2019, MDPI, pp. 1-20) (Year: 2019).*
Syed et al. (Analysis of terrestrial water storage changes from GRACE and GLDAS, Water Resources Research, 2008, pp. 1-5) (Year: 2008).*
Xie et al. (Monitoring Groundwater Storage Changes in the Loess Plateau Using GRACE Satellite Gravity Data, MPDI,2018, pp. 1-18) (Year: 2018).*
Search Report for related Chinese Patent Application No. 202010478011.6 dated Nov. 27, 2020.
English Translation of Search Report for related Chinese Patent Application No. 202010478011.6 dated Nov. 27, 2020.
Feng, W. et al., “Groundwater Storage Changes in China from Satellite Gravity: An Overview,” Remote Sens. 2018, vol. 10, No. 674, 25 pages.
Yi, H. et al., “Satellite gravity measurement monitoring terrestrial water storage change and drought in the continental United States,” Scientific Reports, 2015, 9 pages.
English Abstract for CN-106529164, Publication Date: Mar. 22, 2017.
English Abstract for CN-108614948, Publication Date: Oct. 2, 2018.
English Abstract for CN-109035105, Publication Date: Dec. 18, 2018.
English Abstract for CN110175214, Publication Date: Aug. 27, 2019.

* cited by examiner

METHOD AND SYSTEM FOR INVERSION OF HIGH-RESOLUTION AQUIFER STORAGE COEFFICIENT BASED ON GRAVITY SATELLITE DATA

TECHNICAL FIELD

The present disclosure relates to the field of water resources management and hydrogeology, in particular to a research on calculation and evaluation of groundwater resources, and hydrogeological calculation, and more particularly to a method for inversion of high-resolution aquifer storage coefficient based on gravity satellite data.

BACKGROUND

Storage coefficient is classified into a specific yield and a storativity, which are both physical quantities that characterize a water supply capacity of aquifers and are very important hydrogeological parameters in evaluation and dynamic forecasting of groundwater resources, sustainable use of groundwater, and hydrogeological calculations. The specific yield refers to the volume of water removed from a unit volume of an unconfined aquifer for a unit drop in water level. The storativity refers to the volume of water removed from a unit area of a confined aquifer for a unit drop in hydraulic head.

With an increasing shortage of water resources and a large-scale development and utilization of groundwater resources, as an important link in a study of continuous utilization of groundwater, an analysis and a calculation of storage coefficient have become increasingly important. The traditional methods for calculating the storage coefficient mainly include: a field pumping test method, a water balance method, and a slug test method, etc. The above methods are time-consuming and laborious, and are mainly used to calculate coefficient values of a single aquifer. However, these methods are only suitable for small-scale researches, and have great limitations for large-scale hydrogeological conditions with complex conditions. And thus the above methods are difficult to solve the problem of calculating the storage coefficient in a large-scale range.

Since the launch of the satellites of the Gravity Recovery and Climate Experiment (GRACE) in 2002, GRACE satellite gravimetry has provided direct observation methods for continuous monitoring of a global time-variable gravity field, wherein the information of the time-variable gravity field monitored by the satellites can be used to inverse terrestrial water storage changes. After deducting non-groundwater storage changes, regional groundwater storage changes can be inversed. As a remote sensing satellite that can monitor water storage changes below the surface, the GRACE gravity satellite breaks through spatial limitations of traditional ground observations and provides a new method for groundwater research and management. By combining with groundwater level data, the GRACE gravity satellite has a potential and an application prospect for estimating storage coefficient. Previously, the research scholar Alex Sun conducted related researches in the central Texas area of the United States and estimated storage coefficient values of different sub-areas by using time series of average groundwater level changes in different sub-areas of a study area and groundwater storage changes data obtained by the GRACE gravity satellite. Alex Sun's researches prove a potential of the GRACE gravity satellite in calculating aquifer parameters. However, 'his researches just obtain an average storage coefficient of the sub-areas, and meanwhile have uncertainties caused by errors owing to data leakage of the GRACE gravity satellite.

Therefore, by combining groundwater level data and the capability of GRACE to monitor large-scale changes of groundwater storages, including GRACE-FO launched in 2018, which is aimed to replace the GRACE that was decommissioned in June 2017, it is necessary to develop a novel method to inverse the storage coefficient with a higher resolution and reflecting the difference of confined aquifer and unconfined aquifer.

SUMMARY

In view of shortcomings of the prior art, an object of the present disclosure is to quickly calculate a regional storage coefficient on a large scale by using a relationship between groundwater storage changes monitored by GRACE/GRACE-FO gravity satellites and groundwater level data, and to solve a problem that the traditional method is time-consuming, labor-intensive and difficult to be applied on a large scale. Specifically, the present disclosure provides the following technical solutions.

In an aspect, the present disclosure provides a method for inversion of high-resolution aquifer storage coefficient based on gravity satellite data, comprising steps S1-S9:

In the first step S1, acquiring gravity satellite data, soil moisture storage data, surface water storage data and other non-groundwater component data, based on a preset region;

In the second step S2, performing a truncation processing and a filtering processing on the gravity satellite data, thereby obtaining monthly time series of terrestrial water storage anomalies inversed by the gravity satellite data;

In the third step S3, performing a forward modeling with a signal leakage on the soil moisture storage data, the surface water storage data and the other non-groundwater component data, thereby obtaining monthly time series of soil moisture storage anomalies, monthly time series of surface water storage anomalies, and monthly time series of other non-groundwater component anomalies;

In the fourth step S4, subtracting the monthly time series of soil moisture storage anomalies, the monthly time series of surface water storage anomalies and the monthly time series of other non-groundwater component anomalies from the monthly time series of terrestrial water storage anomalies, thereby obtaining monthly time series of groundwater storage anomalies in a gravity satellite time-variable signal;

In the fifth step S5, performing an interpolation process on unconfined aquifer groundwater level data and confined aquifer groundwater level data in the preset region, thereby obtaining monthly time series of unconfined aquifer groundwater level anomalies and monthly time series of confined aquifer groundwater level anomalies;

In the sixth step S6, obtaining a groundwater storage trend in the gravity satellite time-variable signal, an unconfined aquifer groundwater level trend and a confined aquifer groundwater level trend, based on the monthly time series of groundwater storage anomalies in the gravity satellite time-variable signal, the monthly time series of unconfined aquifer groundwater level anomalies and the monthly time series of confined aquifer groundwater level anomalies;

In the seventh step S7, performing a stochastic simulation using a Monte Carlo method, based on the preset region, thereby obtaining random sample values of storage coefficient;

In the eighth step S8, performing a forward modeling with a signal leakage, thereby obtaining a correlation coefficient and a Nash-Sutcliffe efficiency coefficient between random value of groundwater storage trend after the forward modeling and the groundwater storage trend in the gravity satellite time-variable signal, based on a relationship between a storage coefficient and a groundwater level; and In the ninth step S9, taking the correlation coefficient and the Nash-Sutcliffe efficiency coefficient as judgment standards, thereby obtaining an inversion result meeting an accuracy requirement.

Preferably, in the first step S1, the gravity satellite data, the soil moisture storage data, the surface water storage data, and the other non-groundwater component data have the same grid magnitude and the same grid range.

Preferably, in the fourth step S4, the monthly time series of groundwater storage anomalies in the gravity satellite time-variable signal are obtained by applying the following formula:

$$\Delta GWS_{GRACE}=\Delta TWS-\Delta SMS-\Delta SWS-\Delta OS$$

wherein, ΔTWS is the monthly time series of terrestrial water storage anomalies; ΔSMS, ΔSWS and ΔOS are the monthly time series of soil moisture storage anomalies, the monthly time series of surface water storage anomalies and the monthly time series of other non-groundwater component anomalies after the forward modeling respectively; and $\Delta GWS_{GRACE}$ is the monthly time series of groundwater storage anomalies in the gravity satellite time-variable signal.

Preferably, wherein in the S5, the interpolation process is performed in the following formula:

$$\hat{Z}(s_0)=\sum_{i=1}^{n}\lambda_i Z(s_i)$$

$$\lambda_i=\frac{d_{i0}^{-p}}{\sum_{i=1}^{n} d_{i0}^{-p}}$$

$$\sum_{i=1}^{n}\lambda_i=1$$

wherein, $\hat{Z}(s_0)$ is an interpolation result at an interpolation point $s_0$; $s_i$ is an $i^{th}$ sample point; $Z(s_i)$ is a measured value obtained at the $i^{th}$ sample point $s_i$; n is the number of sample points around the interpolation point to be used in an interpolation calculation process; $\lambda_i$ is a weight of the $i^{th}$ sample point used in the interpolation calculation process; $d_{i0}$ is a distance between the interpolation point $s_0$ and the $i^{th}$ sample point $s_i$; and p is an exponential value.

Preferably, in the sixth step S6, the groundwater storage trend in the gravity satellite time-variable signal, the unconfined aquifer groundwater level trend and the confined aquifer groundwater level trend are obtained by applying the following formula:

$$\Delta H(t)=a+bt+\sum_{j=1}^{2}A_i\cos\left[\frac{2\pi}{T_j}(r-\varphi_j)\right]+\varepsilon(t)$$

wherein, ΔH(t) is the monthly time series of groundwater storage anomalies in the gravity satellite time-variable signal, or the monthly time series of unconfined aquifer groundwater level anomalies, or the monthly time series of confined aquifer groundwater level anomalies; t is a time; a is a constant term; b is a fitted trend term; $A_j$, $T_j$ and $\varphi_j$ are an amplitude, a period and a phase respectively, wherein $A_j$, $T_j$ and $\varphi_j$ are annual signals when j=1, and they are half-annual signals when j=2; and ε(t) is an error.

Preferably, in the seventh step S8, the relationship between the storage coefficient and the groundwater level is as follows: multiplying a specific yield by an unconfined aquifer groundwater level trend, plus a product of a storativity and the confined aquifer groundwater level trend; wherein, the specific yield and the storativity are stochastically generated by the Monte Carlo method in the seventh step S7.

Preferably, in the eighth step S8, the correlation coefficient is:

$$r=\frac{\sum_{m=1}^{N}(P_m-\overline{P})(O_m-\overline{O})}{\sqrt{\sum_{m=1}^{N}(P_m-\overline{P})^2}\sqrt{\sum_{m=1}^{N}(O_m-\overline{O})^2}}$$

wherein, r is the correlation coefficient; N is the number of all grids in the preset region; $P_m$ is a random value of the groundwater storage trend after the forward modeling of the $m^{th}$ grid in the preset region; $\overline{P}$ is an average value of the random values of the groundwater storage trend after the forward modeling of all grids in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal of all grids in the preset region.

Preferably, in the eighth step S8, the Nash-Sutcliffe efficiency coefficient is:

$$NSE=1-\frac{\sum_{m=1}^{N}(P_m-O_m)^2}{\sum_{m=1}^{N}(O_m-\overline{O})^2}$$

wherein, NSE is a Nash-Sutcliffe efficiency coefficient; N is the number of all grids in the preset region; $P_m$ is a random value of the groundwater storage trend after the forward modeling of the $m^{th}$ grid in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal in all grids in the preset region.

Preferably, the specific yield and the storativity are randomized for N times respectively by the Monte Carlo method subject to a log-normal distribution to obtain N sets of random sample values of the specific yield and the storativity, wherein a magnitude of each set of random sample values is equal to the number of the grids in the preset region.

Furthermore, the present disclosure further provides a system for inversion of high-resolution aquifer storage coefficient based on gravity satellite data, comprising:

- a basis data acquisition module configured to obtain gravity satellite data, soil moisture storage data, surface water storage data and other non-groundwater component data, based on a preset region;
- a monthly time series module configured to perform a truncation processing and a filtering processing on the gravity satellite data, thereby to obtain monthly time series of terrestrial water storage anomalies inversed by the gravity satellite data; and configured to perform a forward modeling with a signal leakage on the soil moisture storage data, the surface water storage data and the other non-groundwater component data, thereby to obtain monthly time series of soil moisture storage anomalies, monthly time series of surface water storage anomalies, and monthly time series of other non-groundwater component anomalies; and configured to subtract the monthly time series of soil moisture storage anomalies, the monthly time series of surface water storage anomalies and the monthly time series of other non-groundwater component anomalies from the monthly time series of terrestrial water storage anomalies, thereby to obtain monthly time series of groundwater storage anomalies in a gravity satellite time-variable signal; and configured to perform an interpolation process on unconfined aquifer groundwater level data and confined aquifer groundwater level data in the preset region, thereby to obtain monthly time series of unconfined aquifer groundwater level anomalies and monthly time series of confined aquifer groundwater level anomalies;

a change trend module configured to obtain a groundwater storage trend in the gravity satellite time-variable signal, an unconfined aquifer groundwater level trend and a confined aquifer groundwater level trend, based on the monthly time series of groundwater storage anomalies in the gravity satellite time-variable signal, the monthly time series of unconfined aquifer groundwater level anomalies and the monthly time series of confined aquifer groundwater level anomalies;

a random sample module configured to perform a stochastic simulation using a Monte Carlo method, based on the preset region, thereby to obtain random sample values of storage coefficient; and an inversion result module configured to perform a forward modeling with a signal leakage, thereby to obtain a correlation coefficient and a Nash-Sutcliffe efficiency coefficient between random value of groundwater storage trend after the forward modeling and the groundwater storage trend in the gravity satellite time-variable signal, based on a relationship between a storage coefficient and a groundwater level; and to take the correlation coefficient and the Nash-Sutcliffe efficiency coefficient as judgment standards, thereby to obtain an inversion result meeting an accuracy requirement.

Compared with the prior art, the present disclosure has such advantages that a high-resolution aquifer storage coefficient can be obtained by inversing the gravity satellite data; a regional storage coefficient can be quickly calculated on a large scale by combining the GRACE/GRACE-FO gravity satellite data with groundwater level data. And the present disclosure has solved a problem that traditional methods are time-consuming and labor-intensive and fail to calculate on a large scale.

DETAILED DESCRIPTION

The technical solutions in the embodiments of the present disclosure will be described clearly and completely with reference to the drawings in the embodiments of the present disclosure. Definitely, the described embodiments are not all the embodiments but a part of the embodiments of the present disclosure. Based on the embodiments of the present disclosure, all other embodiments obtained by those of ordinary skill in the art without creative work shall fall within the protection scope of the present disclosure.

Embodiment 1

Figure 1:
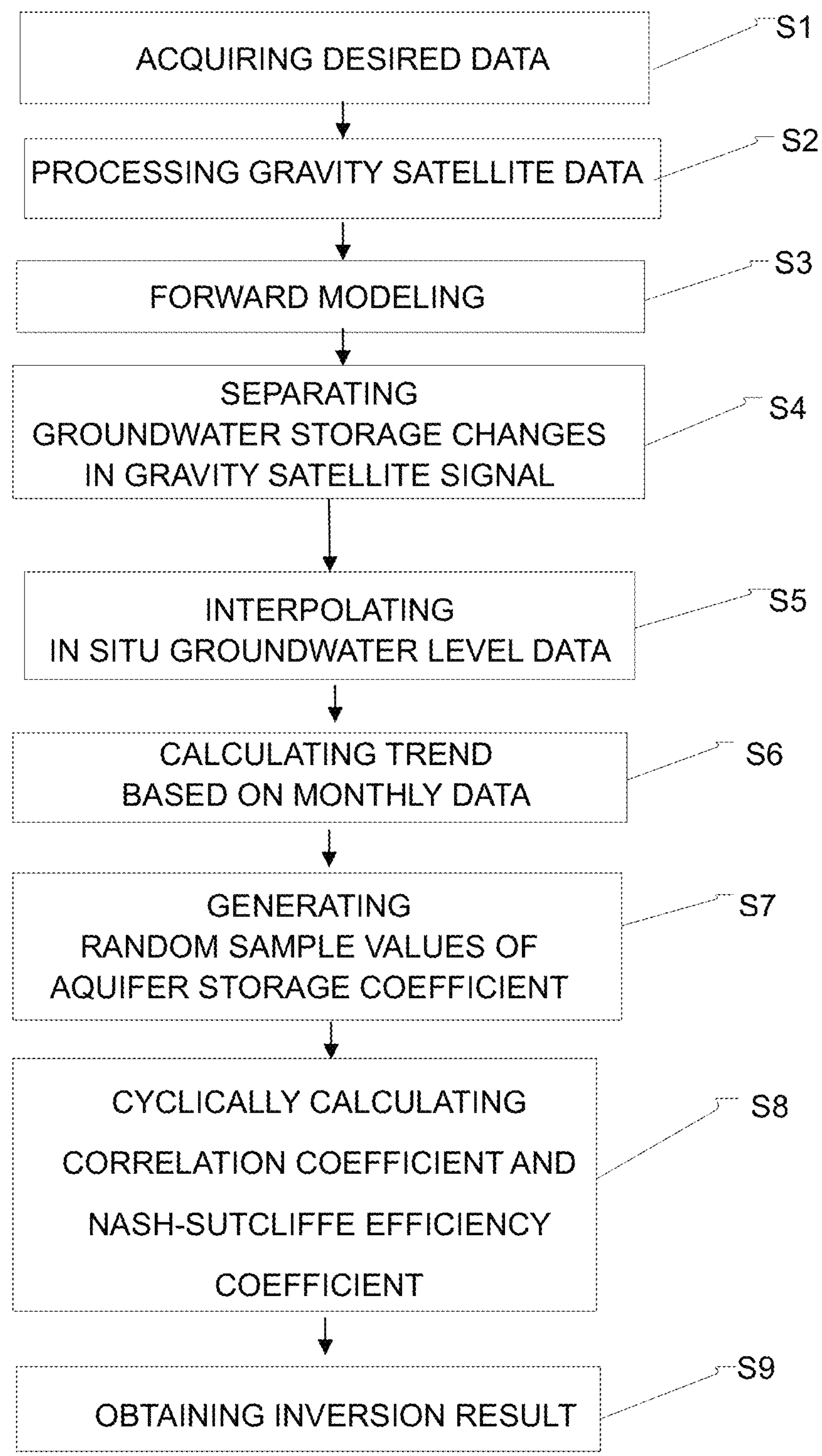
FIG. 1 is flowchart of a method for inversion of high-resolution aquifer storage coefficient based on gravity satellite data according to an embodiment of the present disclosure.

In a specific embodiment, a method proposed by the present disclosure can be implemented as a flowchart FIG. 1. As shown in FIG. 1, in a specific implementation, a method for inversion of high-resolution aquifer storage coefficient based on gravity satellite data may include the following steps.

In the first step S1: acquiring GRACE/GRACE-FO gravity satellite data, soil moisture storage data, surface water storage data, and other non-groundwater component data, which have the same grid magnitude and the same grid range, according to boundary information and longitude and latitude information of a preset region.

In this Embodiment 1, the GRACE/GRACE-FO gravity satellite data are CSRRL05 Level-2 monthly gravity field spherical harmonic data issued by the GRACE Scientific Data System (SDS) organization. The soil moisture storage data applies a monthly soil moisture data set of Common Land Model (CLM) of Global Land Data Assimilation System (GLDAS). The surface water storage data applies reservoir water storage data issued by the "China Water Resources Bulletin" and relevant river basin water resources bulletins included in a preset region of this Embodiment 1. And the other non-groundwater component data includes snow water equivalent data simulated by a GLDAS model. Of course, in other cases, other non-groundwater component data may also include, for example, data of large lakes, rivers, etc., or data that can cause terrestrial water storage changes, which need to be adjusted according to actual data calculation requirements. The content listed in this Embodiment 1 should not be used as a limitation here. Those skilled in the art can also make appropriate extensions, selections, or combinations according to specific model calculation requirements.

It should be noted that:

the GRACE/GRACE-FO gravity satellite data includes, but are not limited to: CSRRL05 Level-2 monthly gravity field spherical harmonic data, GFZRL05 Level-2 monthly gravity field spherical harmonic data and JPLRL05 Level-2 monthly gravity field spherical harmonic data, etc.;

the soil moisture storage data can apply other hydrological model data or measured data;

the surface water storage data includes, but are not limited to: reservoir water storage data, large lake water storage data, etc.;

the other non-groundwater component data include, but are not limited to: snow water equivalent data, South-to-North Water Diversion data, etc.

In the second step S2: as a preferred implementation, the GRACE/GRACE-FO gravity satellite data can use spherical harmonic data truncated to degree and order 60, which needs to be processed at this time: A term C20 is replaced with a value measured by satellite laser ranging; Gaussian filtering processing is performed on the spherical harmonic data to reduce high degree and order noise's impact; the filtered spherical harmonic coefficients are converted into equivalent water height grid data to obtain the monthly time series of terrestrial water storage anomalies inversed by the GRACE/GRACE-FO gravity satellite data.

As a more preferred implementation, in this Embodiment 1, Gaussian filtering processing with a radius of 200 KM may be used, or Gaussian filtering processing with other radii may be used. Of course, in addition, other existing filtering processing algorithms can also be used when noise reduction processing is performed on the truncated data.

In the third step S3: since the truncation processing and the filtering processing will cause leakage errors, in order to eliminate leakage errors' impact, it is necessary to perform a forward modeling with a signal leakage on the soil moisture storage data, the surface water storage data and other non-groundwater component data. That is, the data are converted into spherical harmonic coefficients, truncated to degree and order 60 and Gaussian filtering with the same radius is performed to obtain the monthly time series of soil moisture storage anomalies, the monthly time series of surface water storage anomalies and the monthly time series of other non-groundwater component anomalies after the forward modeling.

In a specific implementation, the monthly soil moisture storage data of the GLDAS model, the reservoir water storage data, and the snow water equivalent data simulated by the GLDAS model are respectively performed the forward modeling. Thereby, the monthly time series of soil moisture storage anomalies, the monthly time series of surface water storage anomalies and the monthly time series of snow water equivalent anomalies after the forward modeling are obtained.

In the fourth step S4: subtracting the monthly time series of soil moisture storage anomalies, the monthly time series of surface water storage anomalies and the monthly time series of other non-groundwater component anomalies after the forward modeling obtained in the third step S3 from the monthly time series of terrestrial water storage anomalies inversed from the GRACE/GRACE-FO gravity satellite data, thereby separating the monthly time series of groundwater storage anomalies in the GRACE/GRACE-FO gravity satellite time-variable signal. Preferably, a difference between corresponding data can be directly calculated, that is, a calculation formula is as follows:

$$\Delta GWS_{GRACE}=\Delta TWS-\Delta SMS-\Delta SWS-\Delta OS$$

wherein, $\Delta$TWS is the monthly time series of terrestrial water storage anomalies; $\Delta$SMS, $\Delta$SWS and $\Delta$OS are the monthly time series of soil moisture storage anomalies, the monthly time series of surface water storage anomalies and the monthly time series of other non-groundwater component anomalies after the forward modeling respectively; and $\Delta GWS_{GRACE}$ is the separated monthly time series of groundwater storage anomalies in the GRACE/GRACE-FO gravity satellite time-variable signal.

In this Embodiment 1, the monthly time series of soil moisture storage anomalies, the monthly time series of surface water storage anomalies and the monthly time series of snow water equivalent anomalies after the forward modeling is subtracted from the monthly time series of terrestrial water storage anomalies inversed from the GRACE/GRACE-FO gravity satellite data, so as to obtain monthly time series of groundwater storage anomalies in the GRACE/GRACE-FO gravity satellite time-variable signal.

In the fifth step S5: obtaining the groundwater level data in the preset region, classifying the groundwater level data into an unconfined aquifer groundwater level and a confined aquifer groundwater level, and then performing an interpolation process to the unconfined aquifer groundwater level and the confined aquifer groundwater level respectively, thereby obtaining the monthly time series of unconfined aquifer groundwater level anomalies and the monthly time series of the confined aquifer groundwater level anomalies, which have the same grid magnitude and the same grid range, and are consistent with the GRACE/GRACE-FO gravity satellite data in grid magnitude and grid range.

For example, the above-mentioned interpolation process may be performed by using the Kriging interpolation method, the sub-regional average interpolation method, the Inverse Distance Weighted interpolation method, etc., or using other interpolation methods in the prior art.

In a preferred implementation, the Inverse Distance Weighted interpolation method can be used for performing a step of estimating unknown points according to a weighted-average of neighboring points. Wherein the weighted-average is performed by using a distance between an interpolation point and a known sample point as a weight. A sample point closer to the interpolation point is weighted greater the weight than those further away. A specific calculation formula is as follows:

$$\hat{Z}(s_0)=\sum_{i=1}^{n}\lambda_i Z(s_i)$$

$$\lambda_i=\frac{d_{i0}^{-p}}{\sum_{i=1}^{n} d_{i0}^{-p}}$$

$$\sum_{i=1}^{n}\lambda_i=1$$

wherein, $\hat{Z}(s_0)$ is an interpolation result at an interpolation point $s_0$; $s_i$ is an $i^{th}$ sample point; $Z(s_i)$ is a measured value obtained at the $i^{th}$ sample point $s_i$; n is the number of sample points around the interpolation point to be used in an interpolation calculation process; $\lambda_i$ is a weight of the $i^{th}$ sample point used in the interpolation calculation process, wherein the weight $\lambda_i$ decreases as the distance between the $i^{th}$ sample point and the interpolation point increases; $d_{i0}$ is a distance between the interpolation point $s_0$ and the $i^{th}$ sample point $s_i$ and a parameter p is an exponential value, wherein an optimal value of the parameter p may be determined by finding a minimum value of a root mean square prediction error; the parameter p has an impact on the weight of the sample point in the interpolation process, that is, as the distance between the $i^{th}$ sample point and the interpolation point increases, a weight of the $i^{th}$ sample point's impact on the interpolation point decreases exponentially; and in the interpolation process, the weight of the impact of the $i^{th}$ sample point's impact on the interpolation point are proportional, and the sum of all these weights is 1.

In the sixth step S6: for each monthly time series, linear trend signals contained therein are found. In a preferred implementation, the groundwater storage trend and the groundwater level trend in the GRACE/GRACE-FO gravity satellite time-variable signal can be obtained, by using a harmonic analysis method with least squares fitting, based on the linear trend signals. Both trends can be obtained by applying the following formula:

$$\Delta H(t) = a + bt + \sum_{j=1}^{2} A_i \cos\left[\frac{2\pi}{T_j}(t - \varphi_j)\right] + \varepsilon(t)$$

wherein, $\Delta H(t)$ is the monthly time series of groundwater storage anomalies (or groundwater level anomalies); t is a time; a is a constant term; b is a fitted trend term; $A_j$, $T_j$ and $\varphi_j$ are an amplitude, a period and a phase respectively, wherein $A_j$, $T_j$ and $\varphi_j$ are annual signals when j=1, and they are half-annual signals when j=2; and $\varepsilon(t)$ is an error.

In this Embodiment 1, the monthly time series of groundwater storage anomalies in the GRACE/GRACE-FO gravity satellite time-variable signal, the monthly time series of unconfined aquifer groundwater level anomalies after the interpolation process, and the monthly time series of confined aquifer groundwater level anomalies after the interpolation process are processed respectively using the above method recited in the sixth step S7. It is also possible to use other methods in the prior art to calculate trend signals included the monthly time series of the groundwater storage anomalies and groundwater level anomalies in the GRACE/GRACE-FO gravity satellite time-variable signal.

In the seventh step S7: performing a stochastic simulation by the Monte Carlo method, thereby obtaining random sample values of the storage coefficient in the preset region. In a preferred implementation, the specific yield and the storativity are randomly simulated by the Monte Carlo method subject to a log-normal distribution, so as to obtain N sets of random sample values of the specific yield and the storativity, wherein the magnitude of each set of random sample values is equal to the number of grids in the preset region.

A probability distribution function of the above log-normal distribution can apply the following formula:

$$y = f(x, \mu, \sigma) = \frac{1}{x\sigma\sqrt{2\pi}} \exp\left(-\frac{(\ln x - \mu)^2}{2\sigma^2}\right) (x > 0, \mu \geq 0, \sigma > 0)$$

wherein, x is a random variable; y is a probability density of x; $\mu$ is a mean of x; and $\sigma$ is a standard deviation of x.

The above Monte Carlo method subject to the log-normal distribution can be implemented by using a random.lognormvariate function in Python. For example, according to hydrogeological prior information of the storage coefficient, the value ranges of random samples of the specific yield and the storativity generated by the random.lognormvariate function are classified in Python, and randomized 100,000 times respectively, thereby correspondingly obtaining 100,000 sets of random sample values of specific yield and storativity, wherein the magnitude of each set of the random samples is equal to the number of grids in the preset region.

In addition, the Monte Carlo method subject to the log-normal distribution can also be implemented in other ways. Alternatively, in specific cases, a Monte Carlo method subject to other probability distributions is used to perform the stochastic simulation to obtain random sample values.

In the eighth step S8: Performing N cycles according to a preset cycle algorithm. In each cycle, calculating random values of the groundwater storage trend, by using the relationship between the storage coefficient and the groundwater level; and performing the same forward modeling with the signal leakage as in the third step S3 to the random value of the groundwater storage trend; and calculating the correlation coefficient and the Nash-Sutcliffe efficiency coefficient between the random value of groundwater storage trend after the forward modeling and the groundwater storage trend in the GRACE/GRACE-FO gravity satellite time-variable signal.

The relationship between the storage coefficient and the groundwater level is as follows:

multiplying the random specific yield by the unconfined aquifer groundwater level trend, plus a product of the random storativity and the confined aquifer groundwater level trend, thereby obtaining the groundwater storage trend. That is, the relationship between the storage coefficient and the groundwater storage trend is reflected. The calculation formula is:

$$\Delta GWS_{Trend} = \Delta H_{UGW} \times Sy + \Delta H_{CGW} \times Ss$$

wherein, $\Delta GWS_{Trend}$ is a groundwater storage trend; $\Delta H_{UGW}$ is the unconfined aquifer groundwater level trend; Sy is the specific yield; $\Delta H_{CGW}$ is the confined aquifer groundwater level trend; and Ss is the storativity.

The correlation coefficient is obtained by applying the following formula:

$$r = \frac{\sum_{m=1}^{N} (P_m - \overline{P})(O_m - \overline{O})}{\sqrt{\sum_{m=1}^{N} (P_m - \overline{P})^2} \sqrt{\sum_{m=1}^{N} (O_m - \overline{O})^2}}$$

wherein, r is the correlation coefficient; N is the number of all grids in the preset region; $P_m$ is a random value of the groundwater storage trend after the forward modeling of the $m^{th}$ grid in the preset region; $\overline{P}$ is an average value of the random values of the groundwater storage trend after the forward modeling of all grids in the preset region; $O_m$ is the groundwater storage trend in the GRACE/GRACE-FO gravity satellite time-variable signal in the $m^{th}$ grid in the preset region; and $\overline{O}$ is an average value of the groundwater storage trend in the GRACE/GRACE-FO gravity satellite time-variable signal of all grids in the preset region.

The Nash-Sutcliffe efficiency coefficient is obtained by applying the following formula:

$$NSE = 1 - \frac{\sum_{m=1}^{N} (P_m - O_m)^2}{\sum_{m=1}^{N} (O_m - \overline{O})^2}$$

wherein, NSE is a Nash-Sutcliffe efficiency coefficient; N is the number of all grids in the preset region; $P_m$ is a random value of the groundwater storage trend after the forward modeling of the $m^{th}$ grid in the preset region; $O_m$ is a groundwater storage trend in the GRACE/GRACE-FO gravity satellite time-variable signal in the $m^{th}$ grid in the preset region; and $\overline{O}$ is an average value of the groundwater storage trend in the GRACE/GRACE-FO gravity satellite time-variable signal in all grids in the preset region.

Figure 2:
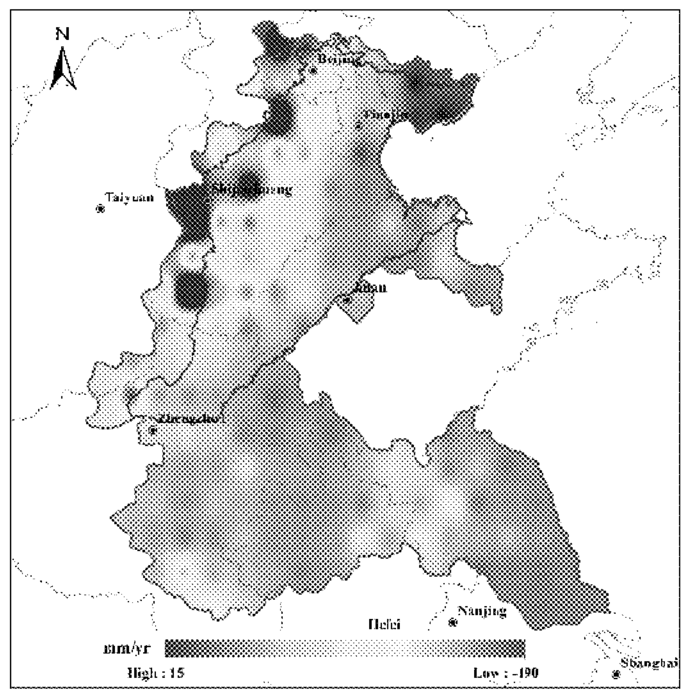
FIG. 2 is a spatial distribution diagram of random values of the groundwater storage trend, calculated from a set of random sample values of specific yields and storativity according to an embodiment of the present disclosure.

In a specific implementation, for example, 100,000 cycles can be performed in conjunction with the result of FIG. 2. In each cycle, according to the relationship between the storage coefficient and the groundwater level, multiplying a certain set of random sample values of the specific yield by the unconfined aquifer groundwater level trend, plus a product of the certain set of the random sample values of the storativity and the confined aquifer groundwater level trend in this certain set, thereby obtaining the certain set of random values of the groundwater storage trend. FIG. 2 shows the spatial distribution of the random values of the groundwater storage trend, calculated from a set of random sample values of the specific yield and the storativity.

Figure 3:
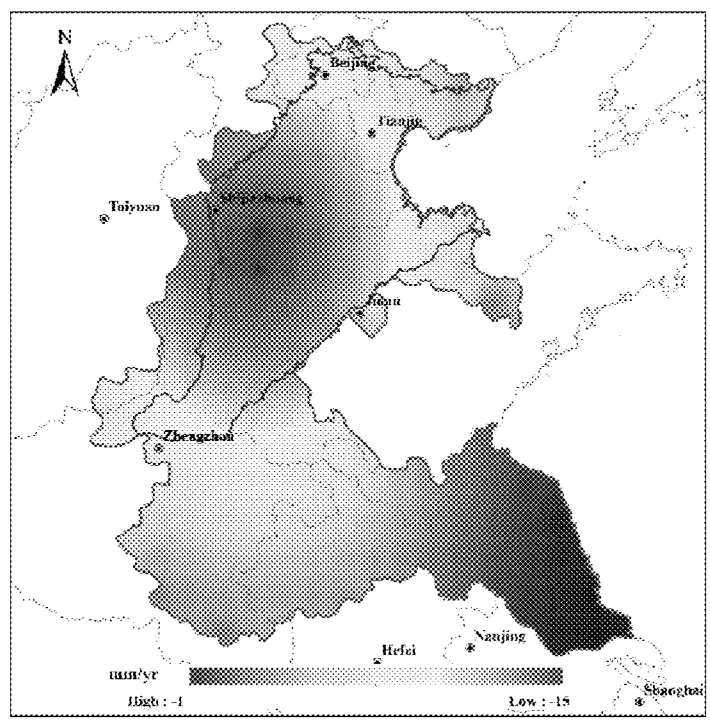
FIG. 3 is a spatial distribution diagram of random values of the groundwater storage trend, calculated from a set of random sample values of specific yields and storativity after the forward modeling according to an embodiment of the present disclosure.

The same forward modeling with the signal leakage as in the third step S3 is performed to obtain random value of the groundwater storage trend after the forward modeling. FIG. 3 shows the spatial distribution of the random values of the groundwater storage trend, calculated from the above-mentioned random values of the specific yield and the storativity after the forward modeling.

After each cycle, the correlation coefficient and the Nash-Sutcliffe efficiency coefficient corresponding to the set of random sample values are calculated.

In the ninth step S9: taking the correlation coefficient and the Nash-Sutcliffe efficiency coefficient calculated in the eighth step S8 as judgment standards, thereby obtaining an inversion result that meets an accuracy requirement.

In this Embodiment 1, a total of 100,000 sets of correlation coefficients and Nash-Sutcliffe efficiency coefficients are calculated. Through analysis and judgment, when the Nash-Sutcliffe efficiency coefficient reaches 0.9, a set of random specific yield and storativity with the highest correlation coefficient is taken as an optimal inversion result. It should be noted that in this Embodiment 1, a total of 100,000 cycles are performed, and in other cases, adjustments can be made according to actual data calculation requirements to obtain an optimal inversion result.

Embodiment 2

In addition to the implementation in the Embodiment 1, the technical solution of the present disclosure can also be implemented by a system for inversion of high-resolution aquifer storage coefficient based on gravity satellite data. In a preferred Embodiment 2, the system includes:

a basis data acquisition module configured to obtain gravity satellite data, soil moisture storage data, surface water storage data and other non-groundwater component data, based on a preset region;

a monthly time series module configured to perform a truncation processing and a filtering processing on the gravity satellite data, thereby to obtain monthly time series of terrestrial water storage anomalies inversed by the gravity satellite data; and configured to perform a forward modeling with a signal leakage on the soil moisture storage data, the surface water storage data and the other non-groundwater component data, thereby to obtain monthly time series of soil moisture storage anomalies, monthly time series of surface water storage anomalies, and monthly time series of other non-groundwater component anomalies; and configured to subtract the monthly time series of soil moisture storage anomalies, the monthly time series of surface water storage anomalies and the monthly time series of other non-groundwater component anomalies from the monthly time series of terrestrial water storage anomalies, thereby to obtain monthly time series of groundwater storage anomalies in a gravity satellite time-variable signal; and configured to perform an interpolation process on unconfined aquifer groundwater level data and confined aquifer groundwater level data in the preset region, thereby to obtain monthly time series of unconfined aquifer groundwater level anomalies and monthly time series of confined aquifer groundwater level anomalies;

a change trend module configured to obtain a groundwater storage trend in the gravity satellite time-variable signal, an unconfined aquifer groundwater level trend and a confined aquifer groundwater level trend, based on the monthly time series of groundwater storage anomalies in the gravity satellite time-variable signal, the monthly time series of unconfined aquifer groundwater level anomalies and the monthly time series of confined aquifer groundwater level anomalies;

a random sample module configured to perform a stochastic simulation using a Monte Carlo method, based on the preset region, thereby to obtain random sample values of storage coefficient; and an inversion result module configured to perform a forward modeling with a signal leakage, thereby to obtain a correlation coefficient and a Nash-Sutcliffe efficiency coefficient between random value of groundwater storage trend after the forward modeling and the groundwater storage trend in the gravity satellite time-variable signal, based on a relationship between a storage coefficient and a groundwater level; and configured to take the correlation coefficient and the Nash-Sutcliffe efficiency coefficient as judgment standards, thereby to obtain an inversion result meeting an accuracy requirement.

Those skilled in the art should understand that the above module settings can be adjusted, based on specific settings.

Moreover, the above-mentioned system in this Embodiment 2 can implement a method for inversion of the high-resolution aquifer storage coefficient, based on the gravity satellite as described in the Embodiment 1.

More preferably, the gravity satellite data, the soil moisture storage data, the surface water storage data, and the other non-groundwater component data have the same grid magnitude and the same grid range.

More preferably, the monthly time series of groundwater storage anomalies in the gravity satellite time-variable signal are obtained by applying the following formula:

$$\Delta GWS_{GRACE} = \Delta TWS - \Delta SMS - \Delta SWS - \Delta OS$$

wherein, $\Delta TWS$ is the monthly time series of terrestrial water storage anomalies; $\Delta SMS$, $\Delta SWS$ and $\Delta OS$ are the monthly time series of soil moisture storage anomalies, the monthly time series of surface water storage anomalies and the monthly time series of other non-groundwater component anomalies after the forward modeling respectively; and $\Delta GWS_{GRACE}$ is the monthly time series of groundwater storage anomalies in the gravity satellite time-variable signal.

More preferably, the interpolation process is performed by applying the following formula:

$$\hat{Z}(s_0) = \sum_{i=1}^{n} \lambda_i Z(s_i)$$

$$\lambda_i = \frac{d_{i0}^{-p}}{\sum_{i=1}^{n} d_{i0}^{-p}}$$

$$\sum_{i=1}^{n} \lambda_i = 1$$

wherein, $\hat{Z}(s_0)$ is an interpolation result at an interpolation point $s_0$; $s_i$ is an $i^{th}$ sample point; $Z(s_i)$ is a measured value obtained at the $i^{th}$ sample point $s_i$; n is the number of sample points around the interpolation point to be used in an interpolation calculation process; $\lambda_i$ is a weight of the $i^{th}$ sample point used in the interpolation calculation process; $d_{i0}$ is a distance between the interpolation point $s_0$ and the $i^{th}$ sample point $s_i$; and p is an exponential value.

More preferably, the groundwater storage trend in the gravity satellite time-variable signal, the unconfined aquifer groundwater level trend and the confined aquifer groundwater level trend are obtained by applying the following formula:

$$\Delta H(t) = a + bt + \sum_{j=1}^{2} A_i \cos\left[\frac{2\pi}{T_j}(t - \varphi_j)\right] + \varepsilon(t)$$

wherein, ΔH(t) is the monthly time series of groundwater storage anomalies in the gravity satellite time-variable signal, or the monthly time series of unconfined aquifer groundwater level anomalies, or the monthly time series of confined aquifer groundwater level anomalies; t is a time; a is a constant term; b is a fitted trend term; $A_j$, $T_j$ and $\varphi_j$ are an amplitude, a period and a phase respectively, wherein $A_j$, $T_j$ and $\varphi_j$ are annual signals when j=1, and they are half-annual signals when j=2; and ε(t) is an error.

More preferably, the relationship between the storage coefficient and the groundwater level is as follows: multiplying a specific yield by an unconfined aquifer groundwater level trend, plus a product of a storativity and the confined aquifer groundwater level trend; wherein, the specific yield and the storativity are stochastically generated by the Monte Carlo method.

More preferably, the correlation coefficient is:

$$r = \frac{\sum_{m=1}^{N}(P_m - \overline{P})(O_m - \overline{O})}{\sqrt{\sum_{m=1}^{N}(P_m - \overline{P})^2}\sqrt{\sum_{m=1}^{N}(O_m - \overline{O})^2}}$$

wherein, r is the correlation coefficient; N is the number of all grids in the preset region; $P_m$ is a random value of the groundwater storage trend after the forward modeling of the $m^{th}$ grid in the preset region; $\overline{P}$ is an average value of the random values of the groundwater storage trend after the forward modeling of all grids in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal of all grids in the preset region.

More preferably, the Nash-Sutcliffe efficiency coefficient is:

$$NSE = 1 - \frac{\sum_{m=1}^{N}(P_m - O_m)^2}{\sum_{m=1}^{N}(O_m - \overline{O})^2}$$

wherein, NSE is a Nash-Sutcliffe efficiency coefficient; N is the number of all grids in the preset region; $P_m$ is a random value of the groundwater storage trend after the forward modeling of the $m^{th}$ grid in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal in all grids in the preset region.

More preferably, the specific yield and the storativity are randomized for N times respectively by the Monte Carlo method subject to a log-normal distribution to obtain N sets of random sample values of the specific yield and the storativity, wherein the magnitude of each set of random sample values is equal to the number of the grids in the preset region.

In addition, the technical solutions of the present disclosure can also be implemented by a device. For example, the device may be configured to include at least one processor and a storage device. The storage device may store instructions for the processor to call and execute the instructions. The instruction can be used to implement the method for inversion of the high-resolution aquifer storage coefficient, based on the gravity satellite as in the Embodiment 1. Alternatively, the device may include the system for inversion of the high-resolution aquifer storage coefficient, based on the gravity satellite as in the Embodiment 2 so as to execute the corresponding method.

A person of ordinary skill in the art can understand that all or part of the processes in the method of the above-mentioned Embodiment 2 can be implemented by instructing relevant hardware through a computer program. The program can be stored in a computer-readable storage medium. The program, when executed, may include the procedures of the above-mentioned method as in the Embodiment 2. The storage medium may be a magnetic disk, an optical disc, a read-only memory (ROM), or a random access memory (RAM), etc.

At last, it should be noted: the above embodiments are merely used to illustrate technical solutions of the present disclosure, but are not limited thereto. Although the present disclosure is described in detail with reference to the above embodiments, an ordinary person skilled in the art should understand: the technical solutions described in the foregoing embodiments may be modified, or some of the technical features may be equivalently replaced. However, these modifications and replacements do not make the corresponding technical solutions depart from the spirit and scope of the technical solutions in the embodiments of the present disclosure.

What is claimed is:

1. A method for inversion of high-resolution aquifer storage coefficient based on gravity satellite data, comprising:

- a first step (S1) of acquiring gravity satellite data, soil moisture storage data, surface water storage data and other non-groundwater component data, based on a preset region;
- a second step (S2) of performing a truncation processing and a filtering processing on the gravity satellite data, thereby obtaining monthly time series of terrestrial water storage anomalies inversed by the gravity satellite data;
- a third step (S3) of performing a forward modeling with a signal leakage on the soil moisture storage data, the surface water storage data and the other non-groundwater component data, thereby obtaining monthly time series of soil moisture storage anomalies, monthly time series of surface water storage anomalies, and monthly time series of other non-groundwater component anomalies;
- a fourth step (S4) of subtracting the monthly time series of soil moisture storage anomalies, the monthly time series of surface water storage anomalies and the monthly time series of other non-groundwater component anomalies from the monthly time series of terrestrial water storage anomalies, thereby obtaining monthly time series of groundwater storage anomalies in a gravity satellite time-variable signal;

a fifth step (S5) of performing an interpolation process on unconfined aquifer groundwater level data and confined aquifer groundwater level data in the preset region, thereby obtaining monthly time series of unconfined aquifer groundwater level anomalies and monthly time series of confined aquifer groundwater level anomalies;

a sixth step (S6) of obtaining a groundwater storage trend in the gravity satellite time-variable signal, an unconfined aquifer groundwater level trend and a confined aquifer groundwater level trend, based on the monthly time series of groundwater storage anomalies in the gravity satellite time-variable signal, the monthly time series of unconfined aquifer groundwater level anomalies and the monthly time series of confined aquifer groundwater level anomalies;

a seventh step (S7) of performing a stochastic simulation using a Monte Carlo method, based on the preset region, thereby obtaining random sample values of storage coefficient;

an eighth step (S8) of performing a forward modeling with a signal leakage, thereby obtaining a correlation coefficient and a Nash-Sutcliffe efficiency coefficient between random value of groundwater storage trend after the forward modeling and the groundwater storage trend in the gravity satellite time-variable signal, based on a relationship between a storage coefficient and a groundwater level; the relationship between the storage coefficient and the groundwater level is as follows: multiplying a specific yield by an unconfined aquifer groundwater level trend, plus a product of a storativity and the confined aquifer groundwater level trend; wherein, the specific yield and the storativity are stochastically generated by the Monte Carlo method in the seventh step (S7), the correlation coefficient is:

$$r = \frac{\sum_{m=1}^{N} (P_m - \overline{P})(O_m - \overline{O})}{\sqrt{\sum_{m=1}^{N} (P_m - \overline{P})^2} \sqrt{\sum_{m=1}^{N} (O_m - \overline{O})^2}}$$

wherein, r is the correlation coefficient; N is the number of all grids in the preset region; $P_m$ is a random value of the groundwater storage trend after the forward modeling of the $m^{th}$ grid in the preset region; $\overline{P}$ is an average value of the random values of the groundwater storage trend after the forward modeling of all grids in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal of all grids in the preset region; and a ninth step (S9) of taking the correlation coefficient and the Nash-Sutcliffe efficiency coefficient as judgment standards, thereby obtaining an inversion result meeting an accuracy requirement.

2. The method according to claim 1, wherein, in the first step (S1), the gravity satellite data, the soil moisture storage data, the surface water storage data, and the other non-groundwater component data have the same grid magnitude and the same grid range.

3. The method according to claim 1, wherein, in the fourth step (S4), the monthly time series of groundwater storage anomalies in the gravity satellite time-variable signal are obtained by applying the following formula:

$$\Delta GWS_{GRACE} = \Delta TWS - \Delta SMS - \Delta SWS - \Delta OS$$

wherein, ΔTWS is the monthly time series of terrestrial water storage anomalies; ΔSMS, ΔSWS and ΔOS are the monthly time series of soil moisture storage anomalies, the monthly time series of surface water storage anomalies and the monthly time series of other non-groundwater component anomalies after the forward modeling respectively; and $\Delta GWS_{GRACE}$ is the monthly time series of groundwater storage anomalies in the gravity satellite time-variable signal.

4. The method according to claim 1, wherein in the fifth step (S5), the interpolation process is performed in the following formula:

$$\hat{Z}(s_0) = \sum_{i=1}^{n} \lambda_i Z(s_i)$$

$$\lambda_i = \frac{d_{i0}^{-p}}{\sum_{i=1}^{n} d_{i0}^{-p}}$$

$$\sum_{i=1}^{n} \lambda_i = 1$$

wherein, $\hat{Z}(s_o)$ is an interpolation result at an interpolation point $s_o$; $s_i$ is an $i^{th}$ sample point; Z(s) is a measured value obtained at the $i^{th}$ sample point $s_i$; n is the number of sample points around the interpolation point to be used in an interpolation calculation process; $\lambda_i$ is a weight of the $i^{th}$ sample point used in the interpolation calculation process; do is a distance between the interpolation point $s_o$ and the $i^{th}$ sample point $s_i$; and p is an exponential value.

5. The method according to claim 1, wherein in the sixth step (S6), the groundwater storage trend in the gravity satellite time-variable signal, the unconfined aquifer groundwater level trend and the confined aquifer groundwater level trend are obtained by applying the following formula:

$$\Delta H(t) = a + bt + \sum_{j=1}^{2} A_i \cos\left[\frac{2\pi}{T_j}(t - \varphi_j)\right] + \varepsilon(t)$$

wherein, ΔH(t) is the monthly time series of groundwater storage anomalies in the gravity satellite time-variable signal, or the monthly time series of unconfined aquifer groundwater level anomalies, or the monthly time series of confined aquifer groundwater level anomalies; t is a time; α is a constant term; b is a fitted trend term; $A_i$, $T_i$ and $\varphi_i$ are an amplitude, a period and a phase respectively, wherein $A_i$, $T_i$ and $\varphi_i$ are annual signals when j=1, and they are half-annual signals when j=2; and ε(t) is an error.

6. The method according to claim 1, wherein, in the eighth step (S8), the Nash-Sutcliffe efficiency coefficient is:

$$NSE = 1 - \frac{\sum_{m=1}^{N}(P_m - O_m)^2}{\sum_{m=1}^{N}(O_m - \overline{O})^2}$$

wherein, NSE is a Nash-Sutcliffe efficiency coefficient; N is the number of all grids in the preset region; $P_m$ is a random value of the groundwater storage trend after the forward modeling of the $m^{th}$ grid in the preset region; $O_m$ is the groundwater storage trend in the gravity satellite time-variable signal in the $m^{th}$ grid in the preset region; and $\overline{O}$ is an average value of the groundwater storage trend in the gravity satellite time-variable signal in all grids in the preset region.

7. The method according to claim 1, wherein, in the seventh step (S7), the specific yield and the storativity are randomized for N times respectively by the Monte Carlo method subject to a log-normal distribution to obtain N sets of random sample values of the specific yield and the storativity, wherein a magnitude of each set of random sample values is equal to the number of the grids in the preset region;

wherein the eighth step (S8) further obtains N sets of random values of the groundwater storage trend corresponding to the random sample value of the specific yield and the storativity based on the relationship between the storage coefficient and the groundwater level, performs the forward modeling with signal leakage to obtain the random value of groundwater storage trend after forward modeling, thereby obtaining the correlation coefficient and the Nash-Sutcliffe efficiency coefficient between each set of random value of groundwater storage trend after forward modeling and the groundwater storage trend in the gravity satellite time-variable signal; and wherein in the ninth step (S9), through analysis and judgment, when the Nash-Sutcliffe efficiency coefficient reaches 0.9, a set of random specific yield and storativity with the highest correlation coefficient is taken as an optimal inversion result.

* * * * *